March 24, 1925.

A. HOLLANDER 1,530,724

HEAD FOR VERTICAL PUMPS AND THE LIKE

Filed March 27, 1924

INVENTOR.
Aladar Hollander
BY Miller Henry & Boykin
ATTORNEYS.

Patented Mar. 24, 1925.

1,530,724

UNITED STATES PATENT OFFICE.

ALADAR HOLLANDER, OF BERKELEY, CALIFORNIA.

HEAD FOR VERTICAL PUMPS AND THE LIKE.

Application filed March 27, 1924. Serial No. 702,240.

*To all whom it may concern:*

Be it known that I, ALADAR HOLLANDER, a citizen of the United States, and resident of Berkeley, county of Alameda, State of California, have invented new and useful Improvements in Heads for Vertical Pumps and the like, of which the following is a specification.

My invention has for its object means for connecting a driving motor and a pump shaft in combination with a pump head and bearings for adjustably sustaining the weight and rotating strains thereof.

Other objects will appear from the drawings and specifications which follow.

Figure 1:
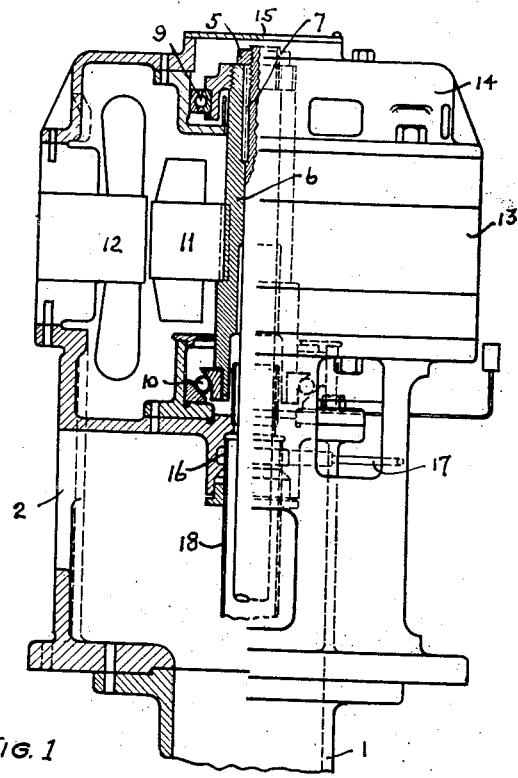
Figure 2:
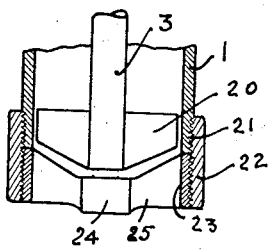

Referring to the drawing, the figure shows partly in view and partly in cross section, the head of a conventional vertical shaft centrifugal pump, to which my invention has been applied. Fig. 1 being of the upper portion and Fig. 2 the lower portion of such a pump.

The well casing of any conventional vertical shaft centrifugal pump is indicated by numeral 1 from which water is pumped and discharged at 2 due to the operation of the pump impeller 20, mounted on the lower end of the shaft 3. The shaft 3 is threaded at its upper end and fitted with a nut 5 by which the shaft 3 may be adjusted axially with respect of the sleeve 6. The sleeve is splined at 7 to the shaft 3 so that it is constrained to rotate with the shaft but may slide axially thereon or be entirely removed by taking off the nut 5. The sleeve 6 is fitted with any bearings 9, 10, whereby the driving strains and weight of the rotating elements are taken up respectively.

Rotation of the shaft 3 is effected by the rotor 11 and stator 12 of the driving electric motor which is mounted within the casing head member 13. At 14 is a chambered cover and 15 is an inspection or hand hold plate, which may be removed to lubricate or adjust the parts. At 16 is a pocket having the pipe 17 to the outside of the motor casing whereby any water leakage from the pressure column which would otherwise force its way into the bearings and motor is drained. At 18 is an inner tube whereby lubrication may be maintained about the shaft 3 without contamination by water from the pressure column, which however forms no part of my present invention.

The operation is as follows: The rotor 11 drives the shaft 3 through the sleeve 6 within the bearings 9, 10. The shaft may be adjusted by the nut 5. The motor may be operated with the driving sleeve and bearings entirely independent of the pump shaft, as for purposes of testing, or the motor and sleeve and bearings or any of them may be removed without removing the pump shaft.

Reference is herein made to my co-pending application, Serial No. 702,240 filed March 27, 1924, for further description of certain features shown but not claimed herein.

The bearing 10 is the thrust bearing carrying the weight or axial thrust.

At the lower end of the column 1 are connections for supporting the shaft, comprising the collar 22 threaded at 21 and carrying the spider rim 23, arms 25, and center 24. When the nut 5 is loosened the shaft 3 rests on the center 24 and the head 13 or bearings 9, 10, or motor parts 11, 12 or sleeve 6 may be freely removed or replaced.

The replacement of the parts and adjustment of nut 5 restores the parts to the full line position shown in the drawing.

It will now be seen that the head of my invention is of the simplest construction and lightest weight and has exceptional facility in installation, operation and adjustment.

I claim:

1. In a head for deep well vertical shaft pumps, a discharge outlet passage and thereabove a chamber through which the shaft passes and closed from said passage, a sleeve about said shaft, bearings in which said sleeve is rotatively mounted, means supporting said bearings within said chamber, and motor means within the chamber between the bearings and fixed to said sleeve and means for axially adjusting the shaft within the sleeve and means connecting the shaft and the sleeve in rotative engagement.

2. The combination set forth in claim 1 wherein the bearings comprise a thrust bearing and a plurality of radial bearings.

3. The combination set forth in claim 1 wherein the bearings comprise a thrust bearing adjacent the wall of the said outlet passage, and a plurality of radial bearings.

4. The combination set forth in claim 1 wherein the said bearings include a thrust bearing supporting the lower end of the sleeve.

5. The combination set forth in claim 1 wherein the said bearings include a thrust bearing supporting the lower end of the sleeve, said thrust bearing positioned adjacent the said outlet passage.

ALADAR HOLLANDER.